United States Patent

[11] 3,582,767

| [72] | Inventors | Thomas W. Brum<br>North Madison;<br>Frank D. Cochran, Mentor, both of, Ohio |
|---|---|---|
| [21] | Appl. No. | 795,597 |
| [22] | Filed | Jan. 31, 1969 |
| [45] | Patented | June 1, 1971 |
| [73] | Assignee | The Lubrizol Corporation<br>Wickliffe, Ohio |

[54] APPARATUS HAVING AN INTEGRATED AMPLIFIERS FOR MONITORING THE CONDUCTIVITY OF SOLUTIONS
10 Claims, 2 Drawing Figs.

[52] U.S. Cl............................................... 324/30,
324/123, 330/38
[51] Int. Cl............................................... G01n 27/42,
[50] Field of Search............................................... 324/30, 65
B, 123; 330/38 M

[56] References Cited
UNITED STATES PATENTS
3,493,857  2/1970  Silverman.....................  324/30X
OTHER REFERENCES
Housey L. Using Integrateds As Feedback Amplifiers in Electron Design Mar. 2, 1964. TK 7800 E5I pp. 49 – 52.

*Primary Examiner*—Edward E. Kubasiewicz
*Attorneys* — Roger J. K. Hsu, William H. Pittman and James W. Adams, Jr.

ABSTRACT: Apparatus for monitoring the conductivity of solutions over a broad range consisting of an electronic circuit including a test electrode which is adapted for immersion in the solution and through which an AC current is passed. The electrode forms part of a bridge circuit for developing an error voltage having a phase and amplitude related to the conductivity of the solution. A synchronous chopper converts the error voltage to an analog DC level for application to an integrated circuit operational amplifier. The amplifier receives as a second input a temperature compensated voltage and a variable feedback resistor connected between the output of the amplifier and the second input serves to vary the gain of the amplifier and adjust the span of conductivity readings. A volt meter is connected to the output of the amplifier to provide a continuous indication of conductivity levels and a further voltage sensing circuit compares the output voltage of the amplifier with a set point level to provide a visual indication of preset conductivity levels and a switching function for external control circuitry.

PATENTED JUN 1 1971
3,582,767
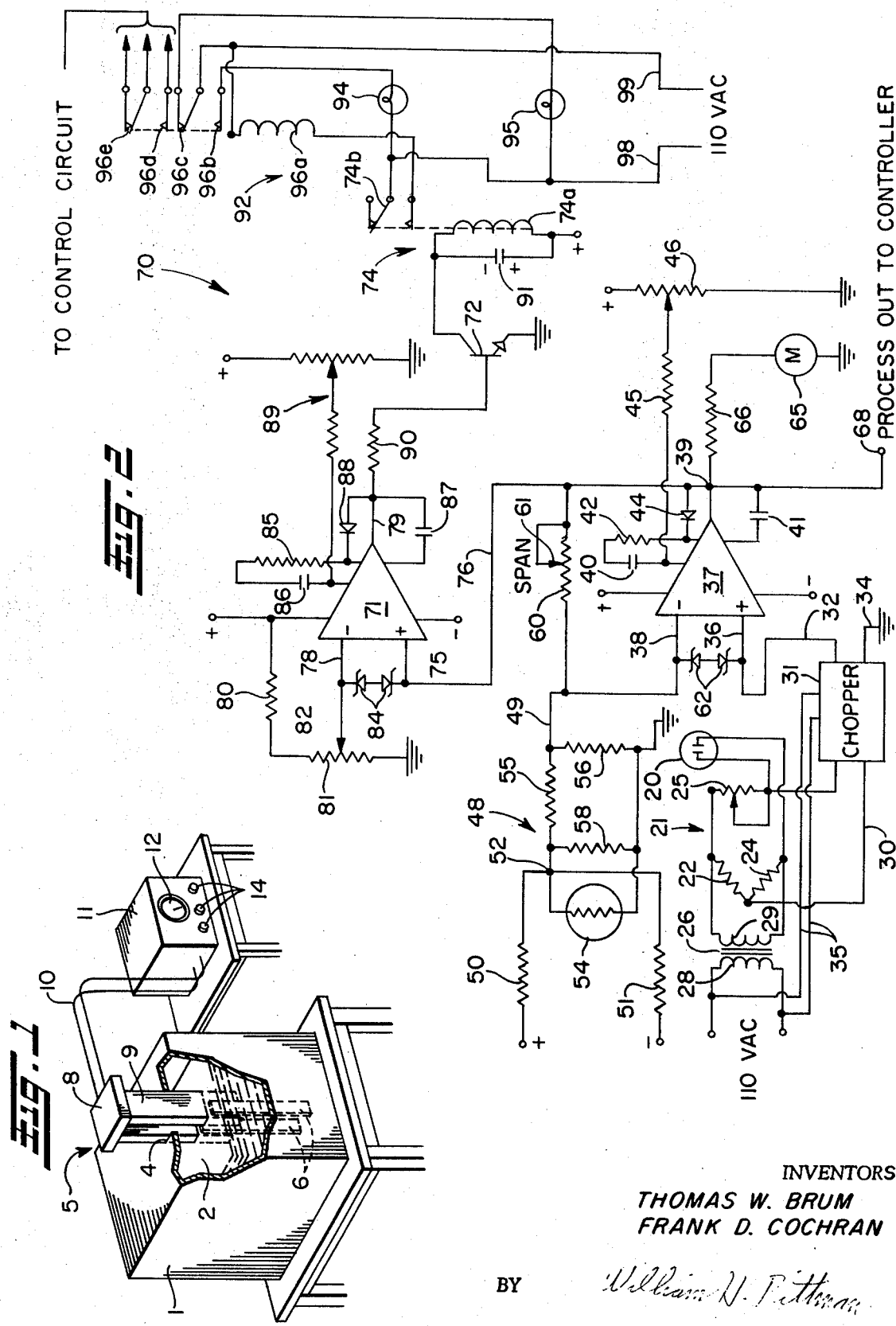
INVENTORS
THOMAS W. BRUM
FRANK D. COCHRAN
BY *William H. Pittman*
ATTORNEY

APPARATUS HAVING AN INTEGRATED AMPLIFIERS FOR MONITORING THE CONDUCTIVITY OF SOLUTIONS

This invention relates to monitoring and control apparatus and more particularly to electronic apparatus for measuring the conductivity of chemical solutions to provide a visual indication of same or to provide a continuous or on-off control signal for operation of a process line or the like.

In chemical processes as well as in many other applications wherein an electrolyte forms a part of the process it is often necessary to alter the characteristics of the electrolyte or maintain its condition within close tolerances in order to achieve a uniform end product. Similarly, in many of these applications it is desirable to be able to automatically control portions of the process as a function of a characteristic of one of the elements in the line. At least it is desirable to maintain constant surveillance of the operating conditions so that an operator may have proof of normal operating conditions or may be able to provide some form of manual compensation to the system.

In the recent past it has become common to employ some form of electronic system for controlling or monitoring conductivity of a solution, for example. However, known forms of apparatus have been quite limited in requiring specific electrode arrangements and electronic circuits for specific applications with little variability possible. Where conductivity of the solution is of significance, it has been necessary in the past to employ a group of electrodes covering the total range of conductivity encountered. Such electrodes might vary in composition of material or spacing or common surface area between electrodes and it is evident that such form of system places restrictions on continuity of operation of a system or a limit on the acceptable range of control.

Therefore, it is one object of this invention to provide an improved conductivity meter which utilizes only a single conductivity sensing cell and provides a much broader range of conductivity measurement than heretofore possible.

It is another object to provide an improved conductivity meter which features a variable gain control in the electronic circuitry to vary the span of the conductivity range and provide more accurate readings of conductivity levels within certain spans.

It is still another object to provide improved monitoring apparatus which supplies a continuous output voltage signal for application to proportional electronic controllers and an on-off control signal variable about a predetermined level of conductivity of solution.

It is a still further object to provide monitoring apparatus which employs in part integrated circuit components, providing greater versatility of circuit operation with a lesser requirement for power together with temperature compensating components for stabilizing circuit operation over a broad environmental range.

It is yet another object to provide improved monitoring and control apparatus which is extremely portable, highly reliable and adaptable for a diversified field of applications.

In the drawings:

FIG. 1 is an environmental view of the monitoring apparatus of this invention shown in relation to a typical phosphating tank, and FIG. 2 is a schematic circuit diagram of the preferred embodiment of this invention.

Referring now to FIG. 1, there is shown a tank 1 partially broken away to expose the fluid 2 contained therein which in this instance is a solution containing free ions and capable of conducting an electric current. Such fluid 2 is thus an electrolyte and may comprise a phosphating solution for utilization in a chemical process line. Located in an aperture 4 in the top of the tank is the cell 5 utilized for monitoring the conductivity of the fluid 2, the cell 5 being formed of two platinum black electrodes 6 fully submerged in the fluid 2 and supported from a mounting plate 8 by means of nonconductive bar members 9. Such cell could be of the Beckman type and such arrangement therefore provides a pair of electrodes 6 having a fixed spacing and a constant surface area exposed and in contact with the fluid 2, being of a material or composition not subject to chemical interaction with the fluid 2 contained in the tank. The electrically conductive electrodes 6 are connected by means of wire leads (not shown) through the insulating support bars 9 for connection by way of output leads 10 to the electronic circuitry of the conductivity meter contained within the cabinet 11. On the front panel of the cabinet 11 is the dial 12 of an indicating meter and several control knobs 14, whose function will be described in greater detail with respect to the circuit portion of the meter.

Referring now to the circuit diagram of FIG. 2, the electrodes comprising the conductivity cell are shown schematically at 20 connected directly into the circuitry. A bridge circuit 21 comprising first and second fixed resistors 22, 24 and a third adjustable resistor 25 form three legs of the bridge with the cell 20 connected as the fourth leg. Energization for the bridge circuit 21 is supplied from a power transformer 26 having a primary winding 28 connected to a source of AC power which may be the conventional 110 volt, 60 cycle AC line and a secondary winding 29 connected to the input terminals of the bridge 21. The output of the bridge circuit is received at the junction of the first and second fixed resistors 22, 24 and the junction of the adjustable resistor 25 and the conductivity cell 20. As is well understood in the art the AC voltage impressed on the input terminals of the bridge will result in AC signals appearing at both output terminals of the bridge, the relative amplitudes of the signals being dependent upon the impedance values of the legs of the bridge. Thus, an AC current is caused to be passed through a portion of the fluid 2 in the tank 1 by way of the contact provided by the electrodes of the conductivity cell 20, such that an AC voltage will be developed across the cell 20 dependent in amplitude upon the conductivity of the fluid 2. For a normalized situation the adjustable resistor 25 may be varied in resistance value to provide a nominal voltage across the cell 20, the adjustable resistor 25 thereby performing the function of a zero adjust for the circuit.

As is well understood in the operation of the bridge circuit as the voltage at one output terminal varies in amplitude in relation to the reference voltage appearing at the second output terminal, an error voltage from the bridge may be realized by sensing the voltage appearing between the output terminals. Such voltage varies in phase and amplitude as a function of the equivalent resistance of the conductivity cell 20 and may have a zero value at a normalized condition as determined by a setting of the adjustable resistor 25.

The output terminals of the bridge 21 are connected by way of lines 30 to a chopper 31 which serves to demodulate the AC error signal and provide a DC analog output voltage proportional in amplitude to the error voltage and of a polarity dependent upon the relative phase of the error voltage. Such output signal is realized as a single ended output voltage appearing on line 32 as referenced to a ground connection at line 34. The chopper 31 may be of many different demodulator types and is not shown in great detail in this description of the invention since the characteristics of same are well understood by those skilled in the art. The chopper 31 may, however, be of the vibrating armature type, the armature being energized by a magnetic field established from the power source as indicated by the lines 35 connected in parallel with the primary winding 28 of the transformer 26 and such movement of the armature of the chopper 31 is therefore synchronous with the voltage appearing across the bridge circuit 21. The chopper 31 is advantageous in this circuit in providing the necessary demodulation with an efficient transfer of the voltage and introducing an extremely low noise level.

The output of the chopper 31 is then applied to the noninverting input 36 of an integrated circuit operational amplifier 37 for further conversion to an electrical signal indicative of the conductivity of the fluid 2 being monitored. The operational amplifier 37 is a commercially available item and may be one of many available types characterized by being a voltage controlled voltage source of high input impedance, relatively low output impedance, high bandwidth and very high gain. The operational amplifier 37 includes the conventional noninverting input 36 and inverting input 38 together with an output terminal 39 and is so connected to suitable power supply voltage levels as indicated in FIG. 2 to provide approximately 0 to 5 volts DC output over the range of conductivity levels being monitored. Capacitors 40, 41 and a resistor 42 provide the necessary frequency compensation for stable closed loop operation of the amplifier 37, being connected between various terminals of the amplifier, as is well understood in this art. A diode 44 is also interconnected with the amplifier to provide protection against latch-up and a resistor 45 and potentiometer 46, the latter connected between a positive voltage source and ground, provide zero offset balance of the amplifier 37, such voltage levels and component values being readily ascertained by designers familiar with the operation of such integrated circuit amplifier arrangements.

A temperature compensated reference supply voltage network 48 is provided having an output voltage on line 49 which is applied to the inverting input 38 of the operational amplifier 37. The network 48 includes series resistors 50, 51 connected between positive and negative voltage sources and has a common junction 52 to which is connected a thermistor 54 and a further voltage divider network comprising series resistors 55, 56 connected between the common junction 52 and ground potential and a fixed resistor 58 paralleling the thermistor 54 to ground potential. The values of the components in network 48 are selected to provide a slightly positive potential at junction 52 and thus at the inverting input 39 of the operational amplifier 37. The thermistor 54 is selected to have suitable characteristics for temperature compensation within the general environmental range expected in laboratory or process line applications.

A feedback element consisting of an adjustable resistor 60 is connected between the output terminal 39 and inverting input 38 of the operational amplifier 37 to affect the gain of the amplifier 37 and provide a range of output voltage for different levels of conductivity of the fluid 2 being monitored. The adjustable resistor 60 cooperates with the reference voltage network 48 to vary the voltage applied at the inverting input 38 of the amplifier 37 as a function of the output voltage of the amplifier. Adjustment of the slider 61 on the resistor 60 provides a variable effect upon the voltage applied at the inverting input 38 and the position of the slider 61 may be calibrated for relation to various scales on the dial 12 for various ranges of conductivity. It will be apparent that as the slider 61 is moved toward the left as viewed in FIG. 2, a greater portion of the resistor 60 will be shunted so that a greater portion of the output voltage of the amplifier 37 will be applied to the reference voltage line 49 resulting in low gain of the amplifier 37 and an expanded range for the measuring apparatus. Alternatively, positioning of the slider 61 to the right as viewed in FIG. 2 will introduce a greater portion of the resistor 60 between the output 39 and input 38 terminals of the amplifier 37 providing more isolation therebetween, resulting in a higher gain of the amplifier 37 and an extended variation of output voltage for a specific variation in input voltage from the bridge circuit 21 or a compression of the monitoring range of the apparatus. A pair of Zener diodes 62 are connected in back to back relation across the inverting and noninverting inputs 38, 36 of the amplifier to provide a limitation on the differential mode voltage for protection of the integrated circuit amplifier 37.

Several means are provided for responding to the output voltage of the amplifier 37, the first being a conventional D'Arsonval-type meter 65 connected in series with a limiting resistor 66 between the output terminal 39 of the amplifier 37 and ground potential forming a volt meter for providing a continuous indication of such output voltage. The dial 12 of the meter 65 is shown in FIG. 1 and may be visually monitored by an operator who will effect a control over the process, varying, for example, the conductivity of the phosphating solution as required or the length of time of immersion of objects in the tank 1 to achieve an optimum chemical reaction.

An output terminal 68 is further provided connected to the output 39 of the amplifier 37 and available as a connection to external controlling circuitry which might operate on a proportional basis receiving a continuous indication of the output of the monitoring apparatus.

A further control circuit 70 is included in the monitoring apparatus and comprises a second integrated circuit operational amplifier 71, a transistor amplifier 71 and a relay 74 actuated thereby together with associated output circuitry.

The integrated circuit amplifier 71 may be of the same type as previously described now connected, however, in an open loop mode as a comparator circuit for comparing the output of amplifier 37 with a predetermined voltage level to provide an output indication or an external control function. The output of amplifier 37 is applied to the noninverting input 75 of comparator amplifier 71 by way of connecting line 76, the amplifier 71 having further, inverting input 78 and output terminal 79. A voltage divider consisting of a series resistor 80 and potentiometer 81 connected between the positive voltage source and ground potential provides a set point or predetermined voltage at the slider 82 of the potentiometer 81 and which is connected to the inverting input 78 of the operational amplifier 71. Serially connected Zener diodes 84 again provide protection for over voltage application between the inputs of amplifier 71 and frequency compensating resistor 85 and capacitors 86, 87, latch-up diode 88 and zero offset balance network 89 are further connected to the amplifier 71 in a manner similar to that previously described for amplifier 37.

The set point voltage appearing at the slider 82 of potentiometer 81 is arranged to fall within the span of output voltage realized at the output terminal 39 of the amplifier 37. Therefore, such set point voltage corresponds to a value of the conductivity of the fluid 2 being measured and may be adjusted to provide a control function when such level of conductivity is realized and measured by the monitoring apparatus. When the voltage at the noninverting input 75 of amplifier 71 exceeds that applied at the inverting input 78, the amplifier 71 will switch to a conducting state to apply positive voltage at the output terminal 79. Such output voltage is applied by way of series resistor 90 to the base electrode of transistor 72 which is normally in a nonconducting state and such positive voltage causes forward bias of the transistor 72 and a relatively heavy flow of current through the collector-emitter circuit.

The coil 74a of relay 74 having associated contacts 74b is in series connection with the collector electrode of the transistor amplifier 72 and a positive voltage source, having an electrolytic capacitor 91 in parallel connection thereacross to provide sufficient time delay to obviate erratic relay operation when monitoring is close to the set point level. Thus, when the transistor 72 conducts due to a sufficiently positive signal from amplifier 71 the coil 74a of the relay 74 will be energized to cause switching of the associated contacts 74b from the normally open state indicated in FIG. 2, to a closed condition.

Contacts 74b control energization of a switching circuit indicated generally at 92 and further the lighting of indicator lamps 94, 95. The circuit 92 includes relay 96 having coil 96a and associated contacts 96b, c, d, e shown in the deenergized state in FIG. 2. Coil 96a is in series connection with contacts 74b and receives power from a conventional 110v AC source via lines 98, 99 such that coil 96a is energized upon energization of relay 74.

Indicator lamps 94, 95 are also adapted to receive power from lines 98, 99, being connected in series with normally open contacts 96b and normally closed contacts 96c, respectively. Lamps 94, 95 are thus alternately energized upon actuation or deactuation of relay 96, lamp 94 being illuminated when monitored conductivity levels of fluid 2 are above the set point level as determined at potentiometer 81, and lamp 95 being illuminated at levels below the set point level. Auxiliary contacts 96d, e operate simultaneously and may be connected, as indicated, to external control circuitry for automatic operation of auxiliary functions, while lamps 94, 95 provide the visual indications which may be monitored by an operator.

We, therefore, particularly point out and distinctly claim as our invention:

1. A meter for indicating the conductivity of solutions, comprising a pair of electrodes adapted to be submerged in the solution under test, means for passing a current through said electrodes and thus through the solution for developing a voltage across said electrodes proportional to the conductivity of the solution, an integrated circuit amplifier having first and second input terminals, a bridge circuit for connecting said electrodes to said amplifier for producing an output voltage as a function of the voltage developed across said electrodes, said electrodes being connected as one leg of said bridge circuit, the output of the latter being operatively connected to said first input terminal of said amplifier, a temperature compensated voltage reference source connected to said second input terminal, a variable feedback element connected between the output of said amplifier and said second input terminal for adjusting the gain of said amplifier, and means connected to said amplifier for providing an indication of the voltage realized at the output of said amplifier.

2. The meter as set forth in claim 1 wherein said indication means comprises a voltmeter connected to the output of said amplifier for providing a continuous indication of the conductivity of solutions under test, and said bridge circuit comprises an adjustable element for varying the proportionality of voltage from said electrodes, thereby to modify the span of indication of said voltmeter.

3. The meter as set forth in claim 2 further including an adjustable reference voltage source, a comparator connected to the output of said amplifier and said adjustable reference voltage source, and a relay actuated by the output of said comparator at such reference voltage level.

4. The meter as set forth in claim 3 further including a pair of indicator lamps connected to alternately energized contacts of said relay for providing a visual indication of the state of said comparator.

5. The meter as set forth in claim 4 wherein said comparator is a second integrated circuit amplifier connected in an open loop mode, said adjustable reference voltage source is connected to the inverting input of said second amplifier and the output of said first amplifier is connected to the noninverting input, whereby when the noninverting input becomes more positive than the inverting input, said second amplifier will switch to a conducting state.

6. Monitoring apparatus for measuring the conductivity of fluids comprising a pair of electrodes adapted to be immersed in the fluid under measurement, a bridge circuit having resistors in three legs, said electrodes being connected as the fourth leg of said bridge circuit, a transformer energized from a source of AC power, the secondary winding of said transformer being connected to energize said bridge circuit and develop an AC error voltage of phase and amplitude related to the conductivity of the fluid under measurement, a demodulator for converting the error voltage to a proportional DC level, an amplifier having first and second input terminals and an output terminal, the DC level of said demodulator being connected to the first input terminal, a temperature compensated voltage source connected to the second input terminal, a feedback element connected between the output and second input terminals, and a meter connected to the output terminal to provide indications of the conductivity of the fluid, said feedback element being adjustable to vary the gain of said amplifier to provide various ranges of conductivity indications at said meter.

7. Apparatus as set forth in claim 6 wherein said demodulator is a chopper synchronized to the AC power source, said amplifier is an integrated circuit operational amplifier, and said feedback element is a variable resistor.

8. Apparatus as set forth in claim 7 wherein one of the resistors in said bridge circuit is a variable resistor for adjusting the error voltage from said bridge circuit, said variable resistor thereby providing a zero-set function for the monitoring apparatus.

9. Apparatus as set forth in claim 8 further including a second operational amplifier connected in open loop mode, the output of said first amplifier being connected as one input to said second amplifier, means for applying a set point voltage as the second input of said second amplifier, a transistor amplifier connected to the output of said second amplifier, and a relay energized by said transistor amplifier when the output of said first amplifier exceeds the set point voltage for providing a control function dependent upon the measured conductivity of the fluid.

10. Apparatus as set forth in claim 9 further including a pair of indicator lamps connected to normally open and normally closed contacts of said relay, and means for energizing such contacts thereby to alternately illuminate said lamps at conductivity levels above or below that level corresponding to the set point voltage.